United States Patent [19]
Miller

[11] Patent Number: 5,247,378
[45] Date of Patent: Sep. 21, 1993

[54] OPTICAL RETARDER HAVING MEANS FOR DETERMINING THE RETARDANCE OF THE CELL CORRESPONDING TO THE SENSED CAPACITANCE THEREOF

[76] Inventor: Peter Miller, c/o Cambridge Research & Instrument, Inc., 21 Erie St., Cambridge, Mass. 02139

[21] Appl. No.: 712,232

[22] Filed: Jun. 7, 1991

[51] Int. Cl.⁵ .......................... G02F 1/13; G09G 1/26
[52] U.S. Cl. ........................................ 359/86; 357/73; 357/84; 357/53; 357/63
[58] Field of Search .................. 359/73, 84, 86, 93, 359/94, 53; 340/742, 798

[56] References Cited

U.S. PATENT DOCUMENTS

| | | | |
|---|---|---|---|
| 2,600,962 | 6/1952 | Billings | 359/73 |
| 4,272,195 | 6/1981 | Kaye | 356/368 |
| 4,385,806 | 5/1983 | Fergason | 350/347 R |
| 4,387,963 | 6/1983 | Brennan | 359/86 |
| 4,394,069 | 7/1983 | Kaye | 359/94 |
| 4,444,469 | 4/1984 | Kaye | 359/94 |
| 4,497,542 | 2/1985 | Kaye | 359/53 |
| 4,548,474 | 10/1985 | Nagae et al. | 359/86 |
| 4,582,396 | 4/1986 | Bos et al. | 350/347 E |
| 4,763,992 | 8/1988 | Takada et al. | 359/86 |
| 4,848,877 | 7/1989 | Miller | 359/94 |
| 4,889,412 | 12/1989 | Clerc et al. | 359/73 |

FOREIGN PATENT DOCUMENTS

| | | | |
|---|---|---|---|
| 0044152 | 1/1982 | European Pat. Off. | 359/86 |
| 0249024 | 11/1986 | Japan | 359/86 |
| 0118326 | 5/1987 | Japan | 359/86 |
| 63-252463 | 10/1988 | Japan . | |
| 0306217 | 12/1990 | Japan | 359/73 |

OTHER PUBLICATIONS

Born, M. and Wolf, E. "Principles of Optics", Pergamon Press, New York 91975).
Yariv, A. and Yeh, P., "Optical Waves in Crystals", Wiley Interscience, New York (1984).
Cognard, J., Alignment of Nemantic Liquid Crystais and Their Mixtures, Monograph: "Molecular Crystals and Liquid Crystal", Suppl. 1 (1982).
Priestly, E. B., "Introduction to Liquid Crystals", Chapters 6, 8, 12, 14, Plenum Press, New York (1979).
Jacobs, S. D., J. OSA B5, No. 9, "Liquid crystal laser optics: design, fabrication, and performance" (1988).
Title, A. M.; Rosenberg, W. J.; "Tunable Birefringent Networks", SPIE vol. 202 Active Optical Devices pp. 47–53 (1979).
Blinov, L. M., "Electro-Optical and Magneto-Optical Properties of Liquid Crystals", John Wiley & Sons, Ltd. pp. 101–130 (1983).

Primary Examiner—William L. Sikes
Assistant Examiner—Huy K. Mai
Attorney, Agent, or Firm—Cohen, Pontani, Lieberman, Pavane

[57] ABSTRACT

The present invention is an optical retarder comprising a liquid crystal variable retardance cell having substrates (2) on either side thereof, each substrate having a transparent electrode (3) on its inner face, a nematic phase liquid crystal material (9) between the substrates (2), means for applying a drive voltage to the transparent electrodes (3), means for sensing the capacitance of the liquid crystal cell and means for determining the retardance of the cell corresponding to the sense capacitance thereof. A tunable hybrid element comprising such an optical retarder in combination with a fixed retardance element (1) is also disclosed. Also disclosed is a tunable Lyot filter based on multiple hybrid retardance elements.

29 Claims, 10 Drawing Sheets

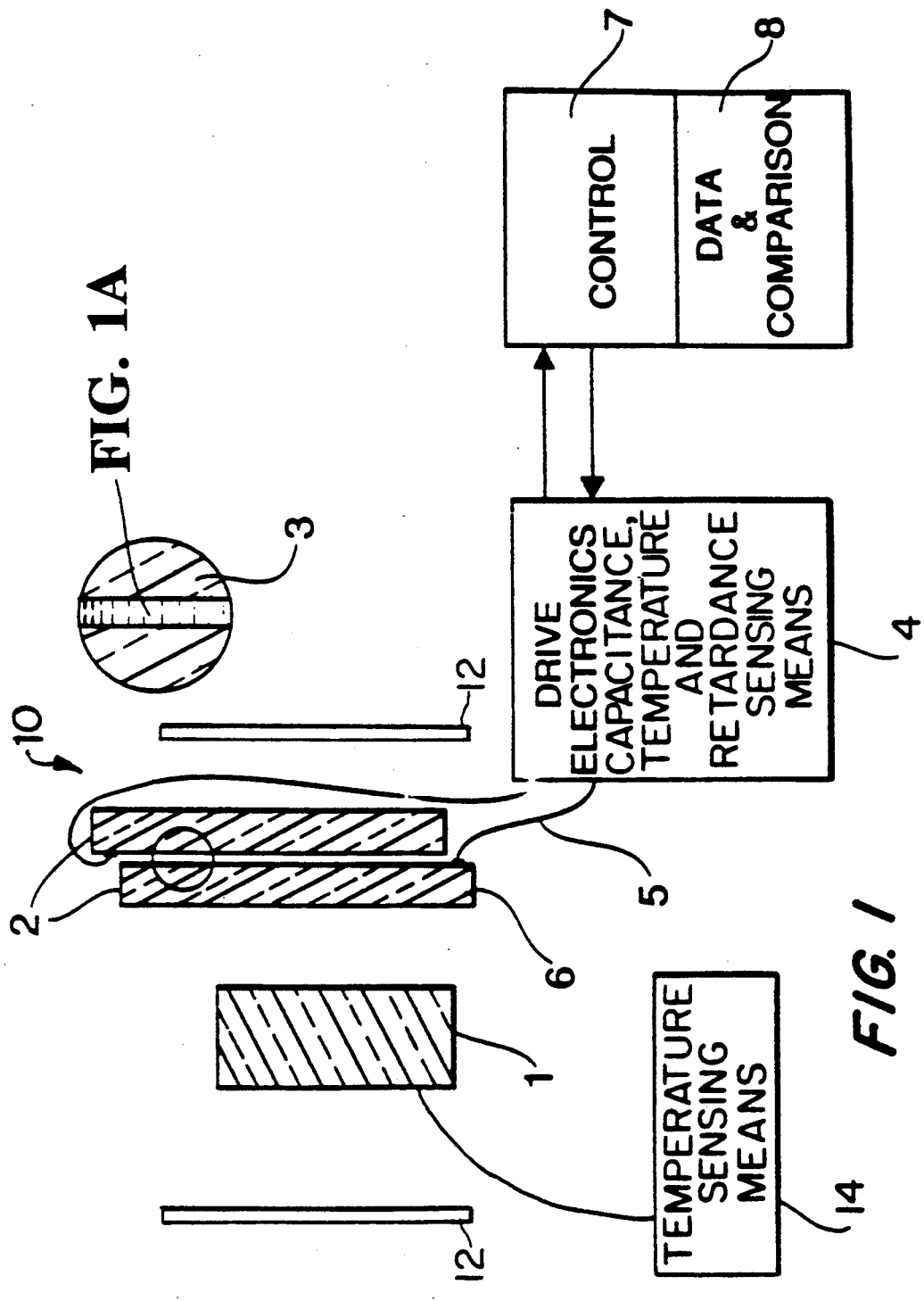

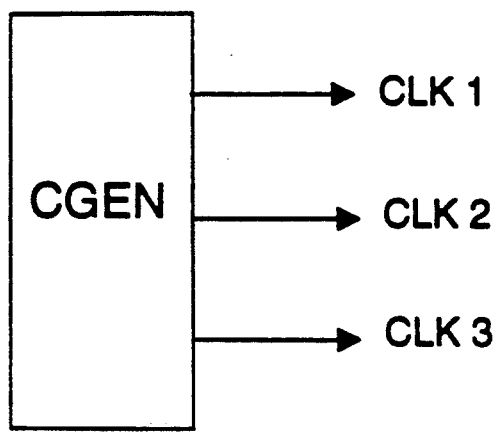
VOLTAGE AT $C_{RES}$
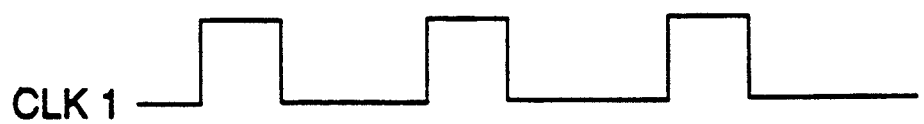
CLK 1
CLK 2
CLK 3
*FIG. 4B*  CLOCK AND TIMING SIGNALS

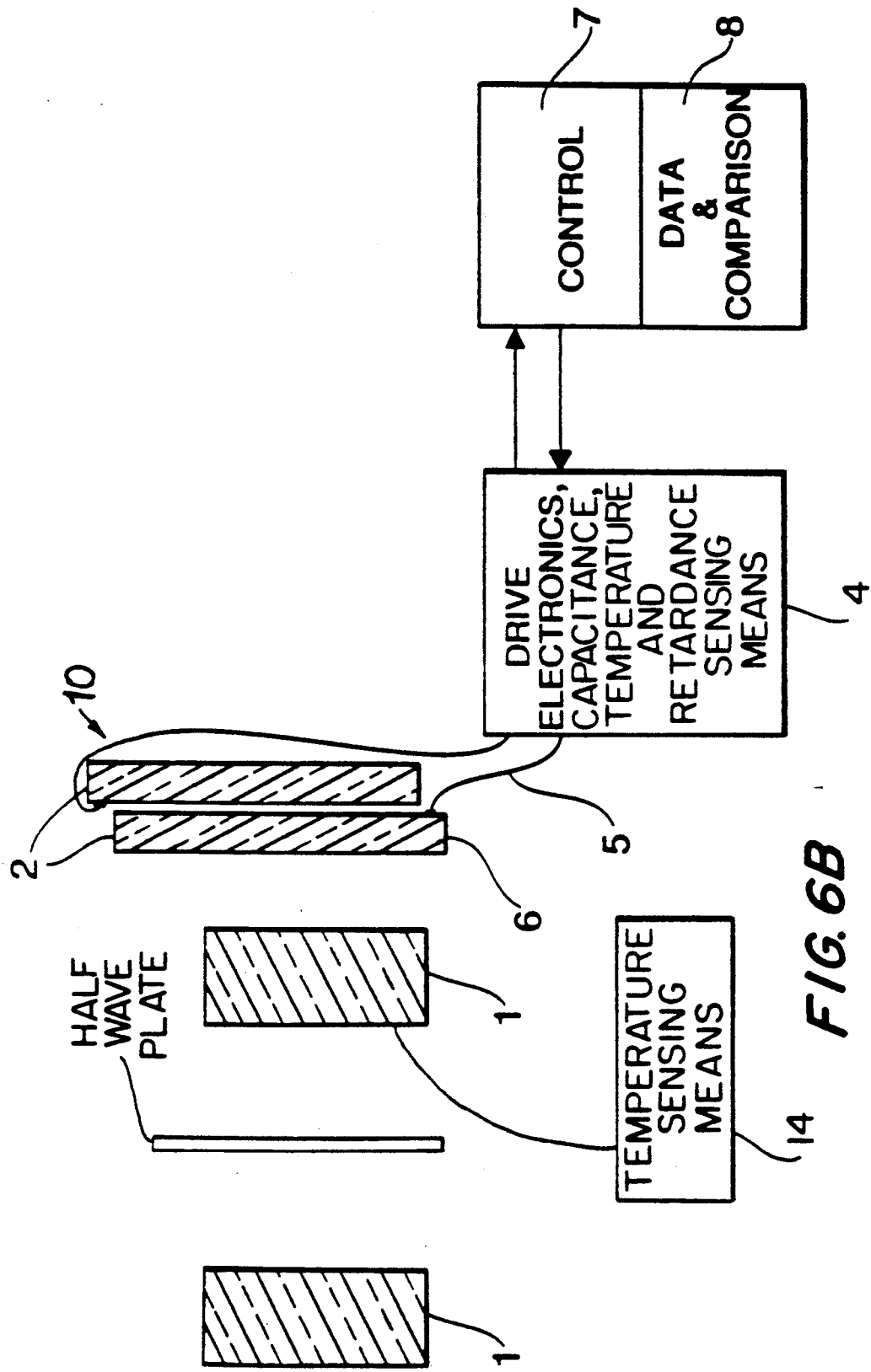

OPTICAL RETARDER HAVING MEANS FOR DETERMINING THE RETARDANCE OF THE CELL CORRESPONDING TO THE SENSED CAPACITANCE THEREOF

FIELD OF INVENTION

This invention regards liquid crystal optical retarders and methods to control them. It is a 350/347 art area and deals with improvements in the tuning of retarder systems and the construction of retarder systems using liquid crystal variable retardance cells in concert with fixed retarders and with other liquid crystal cells.

BACKGROUND OF INVENTION

Lyot filters are widely used to obtain spectral filters of narrow bandpass. They are made of a stack of filter stages, each stage having a fixed retarder plate placed between linear polarizers. Although several variations have been developed, the basic design uses a single retarder per stage, with its slow axis oriented at 45 degrees to the entrance polarizer axis; the exit polarizer of each stage is oriented parallel to the entrance polarizer. The effect is that the stage passes light of wavelength $\lambda_0 = R/n$ without loss, where R is the retardance of the retarder plate and n is an integer. The wavelength $\lambda_0$ which satisfies this equation for a given n is termed the passband center for the order n, and in general several orders may be present. The spacing between successive transmission peaks is termed the free spectral range (FSR), and for $n \gg 1$ is approximated by $$FSR = \frac{\lambda^2}{R} \quad (1)$$

The wavelength separation between the points on the filter transmission curve where the transmission curve falls to half of its peak value is termed the full-width at half-maximum (FWHM); for one of these stages the FWHM is half its free spectral range, or $$FWHM = \frac{\lambda^2}{2R} \quad (2)$$

In the simplest case, a filter consists of several of these stages in series, where each stage has a retarder twice as thick as the previous one In this way the unwanted transmission peaks of the i+1 stage align with the transmission minima of the i-th stage, and so are extinguished. On the other hand, the passband width of the i+1 element is half that of the i-th stage, as given by the above equation. By stacking several elements in series, a very narrow passband can be obtained while maintaining a wide free spectral range. The ultimate bandwidth limit can be quite narrow (0.020 nm) if retarders of high order are employed.

It is common to use 'wide-field' retarder elements for the thickest few elements. These are composed of two retarders of half the desired thickness, separated by a half-wave plate. The half-wave plate is oriented with its fast axis at 45 degrees from the fast axis of the first retarder, and the second retarder is oriented at 90 degrees. This produces the same retardance as a single element for on-axis rays, but its retardance is less sensitive to variations in incidence angle. This increases the field of view of the resulting filter.

Various schemes have been devised to permit tuning of the filter passband; the most widely used places achromatic quarter-wave retarders in series with rotating polarizers or achromatic half-wave retarders. These schemes require mechanical rotation of such elements by hand or by servo-motor in order to effect tuning. Since one element must be adjusted for each stage, the resulting systems are mechanically complex.

Other tuning schemes have employed potassium dihydrogen phosphate (KDP) or other electro-optic tuning elements to directly adjust the retardance. However, these materials require high voltages (>2 kV) to achieve tuning, and are plagued with electrode decay and other operating problems.

Liquid crystals may be used as the retarder medium if they exhibit a nematic phase. In this phase, individual molecules can move freely like molecules in a liquid, but they posess an overall orientation like molecules in a crystal. Because the molecules exhibit retardance, which can be altered by an applied electric field, they may be used as variable retarders. These materials may be used as the retarder elements in Lyot filters [Kaye, 1983] where they are operated with order n of 1 to 15. Single elements can be used to realize excellent rejection at a single wavelength, and Kaye [1985] describes how to make a notch rejection filter which is operated in sequence at a variety of orders, to realize a high average transmission at the transmitted wavelengths, when time-averaged.

To realize high spectral resolvance, it is necessary to have some method of accurately controlling the retardance of each element. This is difficult when using liquid crystal elements: first, the liquid crystal material properties are sensitive to temperature; and second, the retardance of such a cell depends on voltage in a complicated, non-linear way. Finally, it is difficult to construct high order (narrowband) filters, as it is not possible to make liquid crystal retarders with extreme uniformity or high R. For example, Lyot filters used in solar astronomy require that the retarders operate with order n of 10,000 or more. Such elements could not be built using liquid crystals alone.

Improved nematic retarder elements have been described by researchers who have increased their response speed [Fergason, Bos] and off-axis response [Kaye, 1984]. Active retardance sensing and servo systems have been described [Miller] which overcome the thermal and device-to-device variations of these elements and render them suitable for use in precision optical systems. However, such sensing systems have always required one optical sensor per liquid crystal element, and require that a portion of the cell be dedicated to monitoring the retardance. This decreases the useful cell aperture and adds cost and complexity, particularly when many liquid crystal elements are used.

Present cells also are limited in their versatility since thick liquid crystal cells are slow in response and exhibit substantial off-axis retardance variations. The thick cells are needed when there is a larger amount of retardance required, yet they have poorly controlled retardance. Cell life is also a problem with DC-driven thick cells.

Accurate control of any liquid crystal variable retardance cells is also difficult since the response of the cells is not linear to the drive voltage. Some method of sensing and correcting the retardance is required.

There is a need for a variable retarder that is fast in switching time, easily controllable without need for constant optical measurements, and that will permit lower costs of complex retarder systems.

It would also be an advantage if the retarder systems could be switched rapidly and reliably between defined levels of retardance for the purpose of difference or ratio comparisons. This would be useful in instruments in many fields.

Retarder systems are now expensive due to the test and calibration needed for each system. It would be an advantage to have systems that are made with lower cost elements, and to remove some of the expensive calibration and characterization without adding additional steps to the manufacture.

These needs at present are not met by existing retarders or use expensive or complex systems.

DESCRIPTION OF THE INVENTION

This invention solves some of the problems of construction of retarder systems. This invention discloses a liquid crystal variable retarder where the retardance can be precisely determined and can be adjusted by either manual or automatic controls.

The invention further reveals how the retarder that has easily determinable retardance can be coupled with other retarders such that the combinations are more efficient than those retarders currently in use.

In one version of this invention, the invention provides a fast blink function with one or more thin liquid crystal cells driven between two or more retardance levels to view preselected wavelengths in alternation with accurate wavelength determination, and monitoring of the wavelength accuracy can be automatic.

The invention also eliminates the need to use part of the retarder cell as a monitor for tuning purposes, because the retardance is sensed by electrical means, not optical means.

Above all else, this invention builds upon a previous Miller patent that made it possible to use liquid crystal cells in high precision optical systems, and it allows the use of these cells in complex systems in a way that expands the usefulness of these systems and eliminates the difficult control problems faced with other systems.

In presenting this invention, we should first view the existing systems and visit the theory behind them briefly.

Tunable liquid crystal retarders can only be constructed with very thin liquid crystal layers, which limits the maximum retardance which they can exhibit. This in turn limits the spectral resolution of filters made from these parts. On the other hand, retarders made of crystals or minerals can exhibit a large amount of retardance, but the retardance cannot be varied. We have discovered that it is possible to construct retarders which use relatively thin liquid crystal elements placed in series with thick fixed retarders to achieve a retardance which is large, variable, and uniform across the aperture. Such elements possess sufficient tuning range to allow construction of filters which transmit any desired center wavelength within their free spectral range. We term these retarders 'hybrid' retarders.

A single 'hybrid' element is pictured in FIG. 1. The first element is a fixed retarder, which may be made of calcite, mica, quartz, or oriented polymer such as stretched polyvinyl alcohol sheet. It is followed by a liquid crystal cell 0 having substrates 2 on either side thereof and a nematic phase liquid crystal material 9 disposed therebetween. Each substrate has a transparent electrode 3 on its inner surface. The liquid crystal cell 10 is a nontwisted nematic variable retarder. This is typically 5 to 25 microns thick, with a maximum retardance of 1-5 microns. By aligning the fast axis of the liquid crystal cell 10 with either the fast or the slow axis of the fixed retarder 1 the net retardance is made equal to the sum or the difference of the individual elements. We will always consider the case where the retardances are summed; similar results apply when the difference in retardance is taken. The retardance of the 'hybrid' element is adjusted by adjusting the drive voltage applied to the liquid crystal element.

A filter stage may be constructed by placing such an element between parallel polarizers 12; the results described for a simple Lyot stage apply. Such a stage transmits light of wavelength $\lambda_0 = R_{net}/n$, where $R_{net}$ is the sum of the fixed retarder and the liquid crystal retarder. The free spectral range about the passband at center $\lambda_0$ may be approximated (for $n >> 1$) by $\lambda_0^2/R_{net}$. As above, the full-width at half-maximum of the filter stage is simply half the free spectral range, or $FWHM = \lambda hd\ 0^2/(2\ R_{net})$.

We note that for a Lyot stage operating in order n, the change in retardance $dR_{net}$ required to shift the passband wavelength by $d\lambda$ is given by $$dR = nd\lambda \tag{3}$$

Thus, to shift the passband wavelength $\lambda_0$ by the free spectral range $\lambda_0^2/R_{net}$, the retardance must be changed by an amount:

$$dR = \frac{n\lambda^2}{R_{net}} = n\lambda \frac{\lambda}{R_{net}} = n\lambda \frac{1}{n} = \lambda \tag{4}$$

Of course, lesser changes in retardance effect correspondingly smaller shifts in the passband wavelength.

This result is of great importance. It states a single filter stage may be tuned through its free spectral range, by varying the 'hybrid' filter retardance an amount which is always less than $\lambda_0$, the passband center wavelength. What this means is that substantial wavelength tuning may be achieved, across the entire free spectral range, without a requirement for large amounts of retardance tuning in the liquid crystal element.

We note that the slight variations in retardance (such as may arise from spatial variations across the liquid crystal retarder) shift the passband wavelength by an amount $d\lambda = dR/n = \lambda_0(dR/R_{net})$. In order to guarantee good spatial uniformity, we must insure that local variations in passband $d\lambda$ are much smaller than the full width at half maximum. That is, $$\delta\lambda << FWHM \tag{5}$$

$$\frac{dR\ \lambda_0}{R_{net}} << \frac{\lambda_0^2}{2R_{net}}$$

or, multiplying both sides by $R_{net}/\lambda_0$, $$dR << \frac{\lambda_0}{2} \tag{7}$$

This states that the 'hybrid' retarder must be uniform (in retardance) to a small fraction of a wavelength, in order to insure good spatial uniformity.

A filter using a 'hybrid' retarder allows for tunability across its free spectral range, as long as the liquid crystal element has a retardance adjustment range of $\lambda_0$. The fixed retarder generally is made with a retardance $R_{fixed}$ which far exceeds the liquid crystal retardance $R_{l/c}$. Thus, it is the fixed retarder which determines the magnitude of the combined retardance $R_{net}$; this in turn, sets the free spectral range and FWHM of the filter stage.

Fixed retarders are commercially available [Cleveland Crystals, Cleveland OH] having uniform retardance within 1/100 wavelength of visible light with retardances R in the range [10 microns-1 centimeter]. This means that filters can be constructed using 'hybrid' elements, and having a FWHM (for green light) in the range [12 nm-0.012 nm]. No stringent requirements are placed upon the liquid crystal element; it needs a retardance tuning range of $\lambda_0$, and it must be spatially uniform to a small fraction of $\lambda_0$ in retardance. These conditions are easily met using fabrication techniques previously described by Jacobs.

It is possible to use the fixed retarder as one of the substrates of the liquid crystal cell, particularly when birefringent quartz is used as the substrate material. This may be the preferred embodiment when space is at a premium. Care must be taken to avoid hydrostatic pressure in the cell which would induce strain-birefringence in the substrate; this is caused by thermal expansion of the liquid crystal material. Since the liquid crystal is nearly incompressible, the result must be some compression of another material within the volume between the substrates, or the substrates themselves will bow outwards under the hydrostatic stress.

This problem of bowing is discussed in standard liquid crystal texts [Priestley]. In this case, it is preferable to include a compliant region in the edge sealing, for stress-relief. Typically, this is done by sealing the hole used to seal the liquid crystal material (the "fill-hole") with a flexible sealant. The liquid crystal hydrostatic pressure causes this region to be compressed, rather than the substrates themselves.

If two retarders are used as substrates, their retardance may be used in sum or in difference, depending upon whether their fast axes coincide, or if the fast axis of one coincides with the slow axis of the other. This allows for the realization of low retardances (2-20 microns) without using unduly thin quartz substrates.

A complete filter can be constructed by placing k of these stages in series. where each stage has a selected retardance $R_{net}$. The retardance of the i-th stage is termed $R_{net}{}^i$, and the retardances are chosen so that the desired wavelength is passed by all stages, while the unwanted transmission peaks of the stage with greatest $R_{net}$ is blocked by some other stage or stages. We consider the simple scheme described at the outset, where each stage has a fixed retarder of retardance $$R_{fixed}{}^i = 2^i \lambda_0 \quad (8)$$

and the i-th stage operates as a waveplate of order $2^i$. We require that $R_{l/c}$ can be adjusted over a range $[0, \lambda_0]$, so $R_{net}{}^i$ has a range $$R_{net}{}^i = [(2^i)\lambda_0, (2^i+1)\lambda_0] \quad (9)$$

Consider what happens as the liquid crystal element in the n-th (highest-retardance) stage is swept through its retardance range. This induces a wavelength shift of $$d\lambda = \frac{dR}{n} = \frac{dR}{2^k} = \frac{\lambda_0}{2^k} \quad (10)$$

We note that this tuning range is equal to the narrowest element's free spectral range, and term this range $FSR_{narrow}$. If the retarders in other, preceding stages are swept so as to follow this shift, the bandpass wavelength of each stage must shift by an identical amount so that peak transmission is maintained; the retardance shift of the retarder in the i-th stage will be:

$$dR_i = 2^i d\lambda = 2^i \frac{\lambda_0}{2^k} = 2^{i-k} \lambda_0 \quad (11)$$

Since i<k for all but the narrowest stage, i-k will be negative, and the required retardance shift will be only a fraction of a wavelength $\lambda$. Thus, we can sweep the entire filter through a range $FSR_{narrow}$ by tuning each stage i through a retardance range $$dR_i = \frac{d\lambda}{2^{k-i}} \quad (12)$$

where k is the total number of stages. We note that no stage needs a retardance tuning range in excess of $\lambda_0$ to achieve this. To expand the tuning range, one cycles the k-th liquid crystal element repeatedly through the range $[0, \lambda_0]$ while the previous stages sweep this range less rapidly (in a binary progression of sweep rates).

We define the resolving power of such a filter as RP=FSR/FWHM. The FSR of a k-stage filter is set by the free-spectral range of the broadest bandpass element, which is $$FSR = \frac{\lambda_0{}^2}{R_{i=0}} = \frac{\lambda_0{}^2}{\lambda_0} = \lambda_0 \quad (13)$$

while the FWHM is set by the narrowest-bandpass element, $$FWHM = \frac{\lambda_0{}^2}{R_{i=k}} = \frac{\lambda_0{}^2}{2(2^k \lambda_0)} = \frac{\lambda_0}{2^{k+1}} \quad (14)$$

yielding $2^{k+1}$ independent spectral settings. So the filter resolving power can be increased by adding more stages, although this resolving power comes at the expense of lower transmission, increased parts count and cost.

It is important to realize that attaining a high resolving power (or narrow FWHM) does not require a corresponding precision in the liquid crystal elements. The criterion outlined earlier, namely that $dR << \lambda_0$, applies with equal force whether the filter has high resolving power or not. What is required is an accurate knowledge of $R_{fixed}$ and a reliable method of setting $R_{l/c}$ with moderate precision (to a small fraction of a wavelength).

When extremely narrow-band filters are constructed using high-order fixed retarders, their temperatures must be carefully controlled. This is not because the temperature co-efficient of retardance is large in percentage terms, but because the retarders are operated in very high order. For example, a commercial birefringent filter made by Carl Zeiss to transmit the $H_\alpha$ line of hydrogen operates with the highest element in order $n_k > 10,000$, and requires temperature control to $+/-0.03$ degrees C.

If hybrid retarders are used, the temperature of the system may be sensed rather than stabilized, and the drift of the fixed retarder compensated by the liquid crystal element. The temperature is measured, the retardance shift of the fixed element is calculated, and the liquid crystal element is then driven to a new operating point so as to compensate for the calculated shift $dR_{fixed}$ in the fixed retarder. To do this, the fixed retarder temperature must be passively sensed to high precision, but is not actively controlled to the same degree; this is often a much easier task. Suitable techniques for temperature measurement and calculation of the required liquid crystal retardance are known by those who work in this art.

Solc-type filters may be constructed with these same hybrid elements For a folded Solc filter stage, the FSR is given by:

$$FSR = \frac{R}{v^2 + 2v + \frac{3}{4}} = \frac{\lambda_0^2}{R + \lambda_0} \quad (15)$$

where:
FSR = free spectral range
R = retardance of each element in Solc filter
$v$ = filter order, defined by $R = (2v + \frac{1}{2}) \lambda_0$
$\lambda_0$ = passband center wavelength
which in turn requires that the retardance be variable over a range $$R_{max} - R_{min} = R_0 \frac{FSR}{\lambda_0} = \frac{R_0 \lambda_0}{R_0 + \lambda_0} \quad (16)$$

When constructing a hybrid retarder element, the fixed contribution is typically made up from the fixed retarder element, made of e.g. calcite; the above equation for the tuning range simplifies to $\approx \lambda_0$ when $R >> \lambda_0$.

One can realize improved drive precision by active sensing of the liquid crystal cell capacitance when driven. Suppose one measures the electrical capacitance and optical retardance of a liquid crystal cell when a large drive voltage is applied; these same measurements are then repeated with no applied field (other than a small signal used for the capacitance measurement). The retardance is different, and this forms the basis of all tunable liquid crystal retarders; the capacitance will be different in the two cases because of changes in the dielectric constant of the liquid crystal. The difference in optical retardance and the difference in dielectric constant both arise from the reorientation of liquid crystal molecules under the applied electric field. Thus, by monitoring the cell capacitance in normal operation, one may determine the optical retardance.

This is an improved way to determine cell retardance, compared to simple monitoring of the drive voltage, for several reasons. First, it allows prediction of the optical retardance for a given cell capacitance, once the endpoints have been measured. Second, it does not require any optical sensors but works instead only with electrical signals. Third, the retardance is a nearly linear function of capacitance, while it is a very complex and nonlinear function of voltage. Finally, this sensing scheme is less sensitive to variations in manufacture and temperature, for reasons discussed below.

To understand the basis of this sensing scheme, one needs to understand the physical properties of the liquid crystal materials, which are discussed in various texts including Priestley. Also, one needs to be familiar with the optical and dielectric behaviour of uniaxial crystals, which are discussed in *Optical Waves in Crystals* by Yariv and Yeh, or *Principles of Optics* by Born and Wolf.

In the nematic phase, liquid crystals exhibit only orientational order, and show neither translational nor rotational order. The orientational order is quite imperfect, and is characterized by S(), the order function. The mean orientation vector of the molecules is termed the director, which will not, in general, be constant throughout the cell. For our purposes, liquid crystals have the optical and dielectric properties of a uniaxial crystal with crystal axis given by the local director orientation. When an electric field is applied to the cell, the molecules try to align with this field, since they have a positive dielectric anisotropy. The angle $\phi$ between the orientation director and a vector normal to the liquid crystal cell substrate obeys the simplified Leslie-Erickson equation (all time-dependent terms omitted, splay and bend elastic constants taken to be equal, perturbations to the E field due to variations in $\epsilon$ ignored):

$$\frac{k_{eff}}{E^2 \delta\epsilon} \frac{\partial^2 \phi}{\partial x^2} - \sin\phi\cos\phi = 0 \quad (17)$$

where:
$k_{eff}$ = effective elastic bend-constant of liquid crystal material
E = applied electric field strength
$\delta\epsilon = \epsilon_\| - \epsilon_\perp$
$\epsilon_\|$ = dielectric constant parallel to director
$\epsilon_\perp$ = dielectric constant perpendicular to director
x = distance from the substrate surface
when E exceeds the Freedericksz level, $E_f$. The solution to this equation, as presented by Priestley, is a family of curves $\phi(x)$ which can be parametrized by the dimensionless constant $\alpha = E/E_f$. The distribution of director angles for any cell, with any set of material values and dimensions, is uniquely specified by this single parameter.

The capacitance of a liquid crystal cell is given by $C = Q/V$, where C is the capacitance of the cell, Q is the charge on each plate, and V is the voltage across the plates Determining V is a bit more complex in this case than for a normal flat-plate capacitor since the liquid crystal dielectric is anisotropic and its crystal axis varies through the cell according to $\phi(x, \alpha)$. The effective dielectric constant $\epsilon_\phi$ in a region with director angle $\phi$ is given by:

$$\epsilon_\phi = \epsilon \cos^2\phi + \epsilon_\perp \sin^2\phi \quad (18)$$

We recall that the electric induction D is given by $D = \epsilon_\phi E$, and within the cell the absence of charge insures D = constant. In turn, this means that $$E_x = \frac{D}{\epsilon_\phi(x)} \quad (19)$$

whence $$V = \int E(x)dx = D\int \frac{dx}{\epsilon_\perp \cos^2\phi_x + \epsilon_\| \sin^2\phi_x} \quad (20)$$

or, solving for D, $$D = \frac{V}{\left[\int \frac{dx}{\epsilon_\perp \cos^2(\phi) + \epsilon_\| \sin^2(\phi)}\right]}$$

To summarize, V and the plate separation d determine $\alpha$ and we can calculate $\phi(x, \alpha)$ using numerical techniques or one of the published solutions to Eq. 14. We do this for a range of $\alpha$ and produce a family of curves $\phi(x, \alpha)$. From $\phi(x)$ and Eq. 17, we determine D.

Although this is an involved process, it only needs to be done once for a given set of $\epsilon$, since the result depends only upon the dielectric constants and on $\phi(x)$. Then the normalized relation D vs. $\alpha$ is scaled by the cell area and cell thickness, to yield capacitance. path lengths:

$$R = \int [n_e(\phi(x,\alpha)) - n_o]dx \quad (22)$$

where the dependence of $n_e$ is that of a uniaxial crystal as described by Yariv and Yeh. Equation 18 depends only on the optical anisotropy, the cell thickness, and on $\phi(x, \alpha)$.

It is possible to derive the normalized curve of R vs. C, by tabulating both as a function of the independent parameter $\alpha$. The exact relation may be calculated using computer models or may be measured empirically. Measured data for optical retardance R and electrical capacitance C is plotted as a function of applied voltage for a liquid crystal cell in FIG. 2(a–b). Measured data for R is plotted as a function of C for the same cell in FIG. 3. This data may be used to determine the retardance of a partially driven cell, as follows:

a) measure the cell retardance and capacitance in the undriven state;
b) measure the cell retardance and capacitance in the fully driven state;
c) use these endpoint measurements to scale the normalized curve, which is very nearly a straight line;
d) interpolate along this scaled curve to determine R for the observed C.

This scheme offers a number of benefits to the optical system designer. First, we point out that the determination of R in the undriven and driven states may be performed at some calibration interval, since the difference between the extra-ordinary optical index $n_e$ and the ordinary optical index $n_o$ is expected to be stable in time. There is no need to optically monitor the cell while it is in use.

The system allows one to accurately place a liquid crystal cell in a desired retardance state. The measurements of C may be performed using the same electronics used to generate the cell drive voltage. A determination of capacitance to better than 0.1 percent can be achieved, using the circuit described below. Given the range of slopes of dR/dC, this allows location of the retardance within about 0.1 percent of its range. This resolution is finer than the spatial uniformity of most cells.

The system is less sensitive to temperature shifts than a simple tabulation of retardance vs. applied voltage, as follows. The dominant contribution to dR/dT in some partially driven state is due to changes in $E_f$, specifically to changes in k, which varies approximately as $S(T)^2$, where $S(T)$ is the thermodynamic order parameter of the liquid crystal material. The variation in $E_f$ for a typical liquid crystal mixture (ZLI.1132) is 0.59 percent/C at room temperature, which produces a similar percentage change in retardance; we note that the capacitance will shift accordingly, and will be sensed and compensated for by this system. Indeed, any change in the system which acts to shift only the director function $\phi(x)$ will be sensed and compensated for by this system, and the determination of R not be degraded.

Variables which have a strong effect on the R(v) function include: variations in the tilt angle $\phi(x=0)$ such as may arise from variations in processing or deposition of the liquid crystal cell alignment layer; batch variations in the dielectric anisotropy $\delta\epsilon$ of the liquid crystal material; batch variations in $k_{eff}$ of the liquid crystal material; and thermal variations of the system. Although the raw curves of C(v) and R(v) change substantially, the curve R vs. C is nearly invariant after applying steps a)–d).

The capacitance measurement is somewhat difficult to perform as the cells are generally driven with square wave signals. This leads to a large crest factor when driving a capacitive load-infinite if ideal signal generators are employed. That is because the current flow across a capacitor is proportional to the change in voltage dV/dt, which is zero except during the upward and downward spikes; these are supposed to occur infinitely fast for a perfect square wave. It is not desirable to place a current-sense resistor in series with the cell, since this leads to an increased RC time constant to charge the capacitive cell. This, in turn, leads to an increased time when the cell voltage is near the zero-voltage crossing; during this brief time the liquid crystal cells begin to relax from their field-aligned configuration. This produces an undesirable time-variation (ripple) in the optical retardance.

Instead, a charge dispense circuit is employed to drive the cells. This consists of a reservoir capacitor, a SPDT solid state switch, a DPDT solid state switch, and clock circuitry. The reservoir capacitor must be a high grade capacitor with low leakage, low dielectric soaking, low voltage coefficient of capacitance, and low loss. Suitable capacitors include polystyrene and polypropylene devices. This capacitor is charged to a known initial voltage, $V_{res\ init}$, and so holds a total charge of $$Q_{res\ init} = C_{res} V_{res\ init} \quad (23)$$

Similarly if the liquid crystal cell has an initial voltage of $V_{lc\ init}$, $$Q_{lc\ init} = C_{lc} V_{lc\ init} \quad (24)$$

Then, the DPDT switch is employed to charge the liquid crystal cell from the reservoir capacitor. After an equilibration time, during which charge flows from the reservoir to the cell, some final voltage $V_{final}$ is obtained. As the capacitance of the reservoir capacitor and the liquid crystal cell are in parallel (connected through the switch), we may write $$Q_{final} = C_{net} V_{final} = (C_{res} + C_{l/c\ cell}) F_{final} \quad (25)$$

When the DPDT switch is an FET device with low charge leakage, there is no loss of charge, and $$Q_{final} = Q_{lc\ init} + Q_{es\ init} \qquad (26)$$

After the equilibration is complete, the DPDT switch is set to open circuit, and the voltage at the reservoir capacitor is measured with a high impedance sense circuit.

In the preferred circuit, this process is repeated at a frequency of 100 Hz to 5 kHz. The polarity of the liquid crystal cell is alternated between successive cycles, so it is driven alternately positive and negative. This insures freedom from DC signal which is necessary for a long cell lifetime. Also, it means that the voltage across the liquid crystal cell before connection to the reservoir capacitor is simply $-V_{final}$. Knowing this, we may combine Equations 24–26 to yield $$C_{res}V_{res\ init} + C_{lc}V_{lc\ init} = (C_{res} + C_{lc})V_{final} \qquad (27)$$

and substitute $V_{lc\ init} = -V_{final}$ to solve for $C_{lc\ cell}$ by:

$$C_{res}V_{res\ init} - C_{lc}V_{final} = C_{res}V_{final} + C_{lc}V_{final} \qquad (28)$$

$$C_{res}(V_{res\ init} - V_{final}) = 2\,C_{lc}V_{final} \qquad (29)$$

or $$C_{lc} = C_{res} \times \frac{V_{res\ init} - V_{final}}{2V_{final}} \qquad (30)$$

which gives the value of $C_{lc}$ in terms of the known $C_{res}$ and the measured voltages $V_{res\ initi}$ and $V_{res\ final}$.

This is the best way to measure capacitance while driving a liquid crystal cell, as it is easily tailored to cells of different geometry (and hence, capacitance) through choice of $C_{res}$; it provides rapid charging of the liquid crystal cell and so avoids relaxation near the zero-crossing; it permits determination of the capacitance by means of equilibrium measurements rather than transient measurements, which increase accuracy. Finally, it is insensitive to drive voltage, which is a subtle but important point. Methods which sense capacitance by means of a small 'tickle' signal on top of a substantial drive signal do not sense the true capacitance. Such a measurement, properly executed, gives a reading of $dQ/dV$ for small excursions about the operating point. However, because $C(v)$ is strongly nonlinear, this reading does not bear any simple relation to the true capacitance, $Q/V$.

A realization of this circuit where the reservoir capacitance is comparable to the cell capacitance, or smaller, gives an unusual result which is of benefit when semi-precise control of retardance is sufficient. We note that the capacitance of a liquid crystal cell increases with increasing drive voltage, and this curve is very steep near the Freedricks transition, as shown in FIG. 2. In the region just above the transion, one may make the approximation that the drive voltage is nearly constant over a wide range of capacitances. In this approximation, the charge $Q=CV$ required to drive the cell is proportional to the cell capacitance, over a small range of voltage.

When a charge dispense circuit is used, and the reservoir capacitor is comparable to the cell capacitance, or smaller, the total charge after equilibration (on the reservoir capacitor and on the cell) is dominated by the charge on the cell. As we have just shown, this charge is approximately proportional to the cell capacitance, which varies linearly with retardance. So, the total charge is approximately proportional to retardance. To analyze this in more detail, we consider the total charge, given by $$Q_{total} = Q_{lc\ init} + Q_{res\ init} = C_{lc}V_{lc\ init} + C_{res}V_{res} \qquad (31)$$

Since charge is conserved (and not lost to the switching process), $$Q_{init} = C_{res}V_{res\ init} + C_{lc}V_{lc\ init} = (C_{res} + C_{lc})V_{final} = Q_{final} \qquad (32)$$

We know $V_{lc\ init} = -V_{final}$ when the drive is alternated, as discussed above. Also, since we are approximating V as nearly constant near the Freedricks transition, we write $V_{lc\ init}$ and $V_{final}$ as $V_{Fr}$, a constant. Then, $$C_{res}V_{res\ init} = (C_{res} + 2C_{lc})V_{Fr} \qquad (33)$$

Solving for $C_{lc}$, $$C_{lc} = \frac{C_{res}V_{res\ init} - C_{res}V_{Fr}}{2V_{Fr}} \qquad (34)$$

which varies directly with the drive voltage used to charge the reservoir capacitor. This circuit thus provides a simple, semi-precise way of driving a liquid crystal cell with nearly linear relation between the drive voltage and the cell retardance. In practice, the value of the reservoir capacitor is chosen to realize the most linear relation.

DESCRIPTION OF THE DRAWINGS

In FIGS. 1 and 1A a hybrid retarder is shown consisting of a fixed retarder and a liquid crystal retarder and where the retarder has a control unit attached to the drive. The fixed retarder 1 is in line with a liquid crystal cell that consists of transparent cell membranes 2 that have a conductive coating on the inner side 3. The conductive coating is attached to drive electronics 4 by wires 5 and a distribution bus in the cell area 6. A control is also present 7 which uses the capacitance signal for input and provides feedback to the drive by use of data banks and comparator signals 8. The liquid crystal cell is filled with a nematic phase material 9.

FIGS. 5, 6A, 6B, 7 show other embodiments of the invention.

PREFERRED EMBODIMENT

Figure 2A:
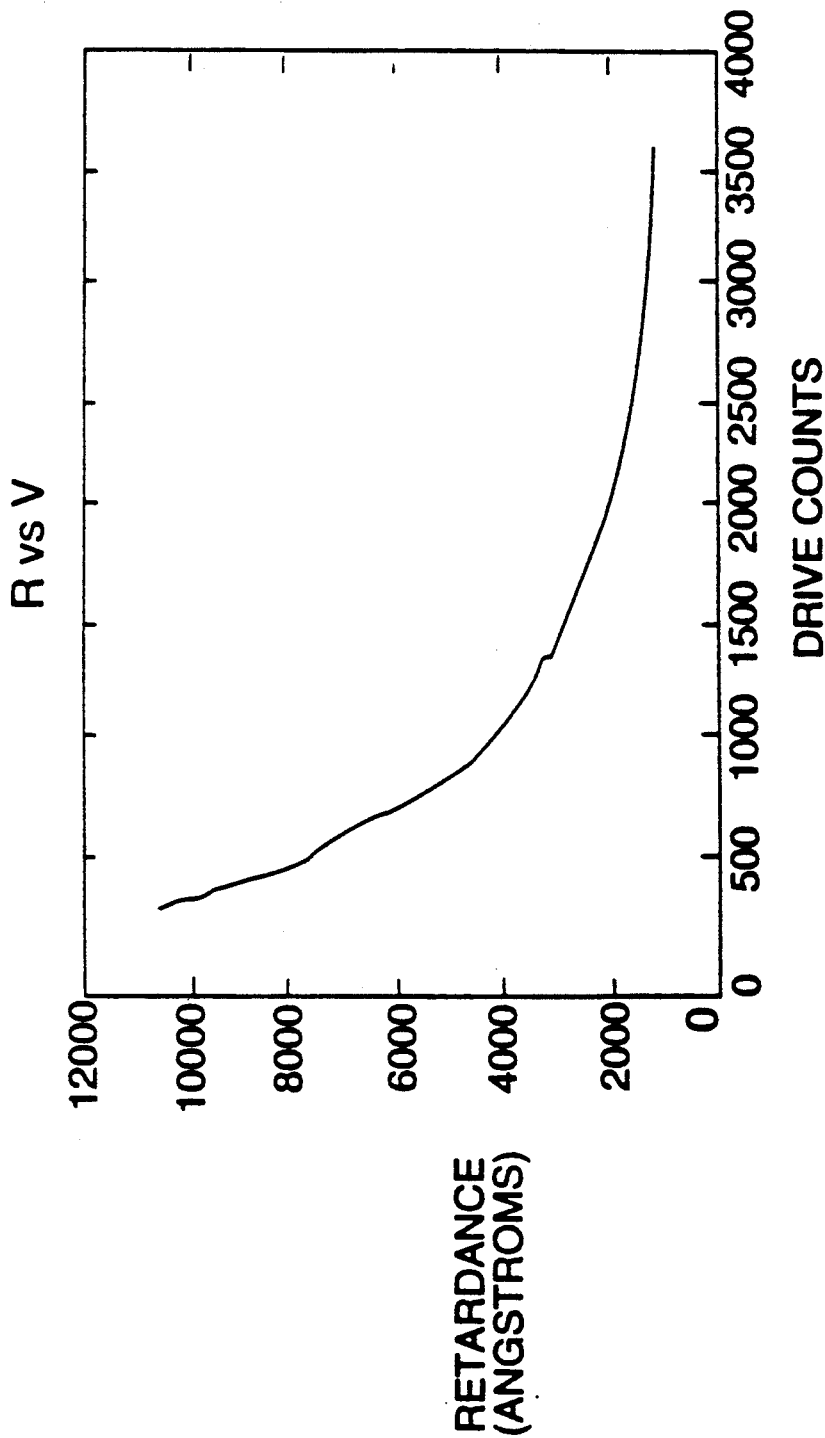
In FIGS. 2(A-B) the retardance and capacitance are shown as a function of voltage for a typical liquid crystal cell.
Figure 2B:
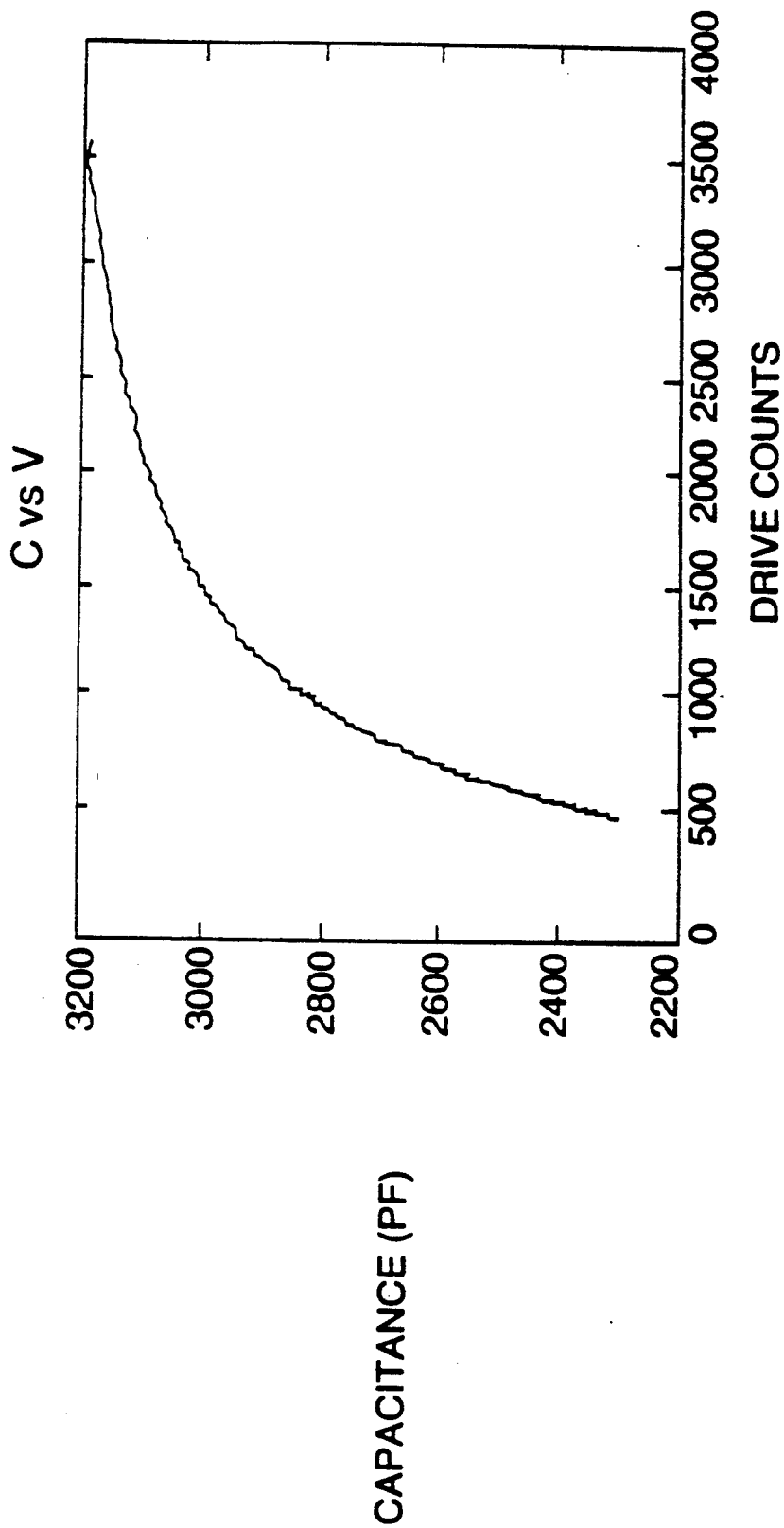
Figure 3:
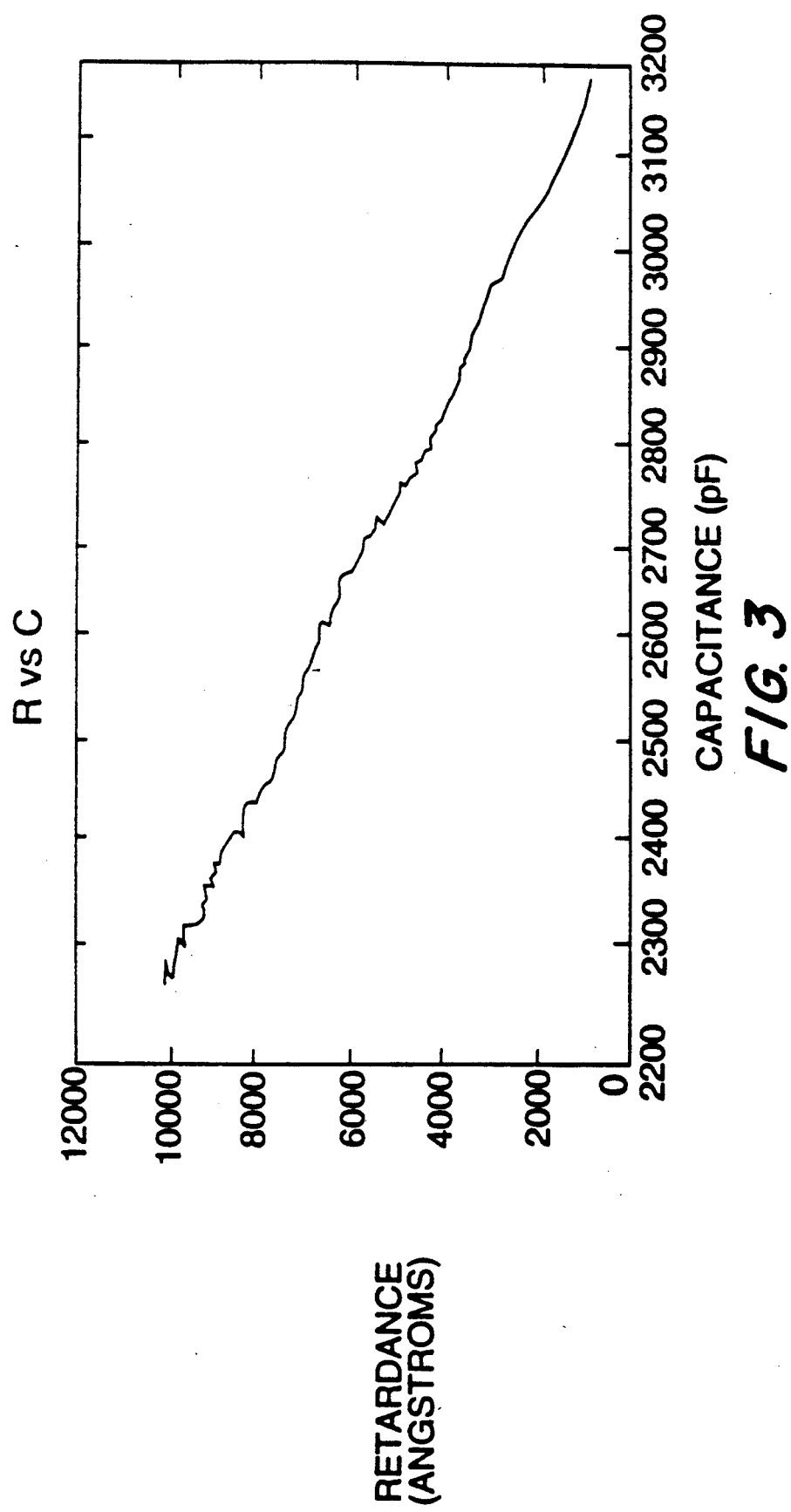
In FIG. 3 the retardance is shown as a function of the capacitance where the relationship is nearly linear.
Figure 4A:
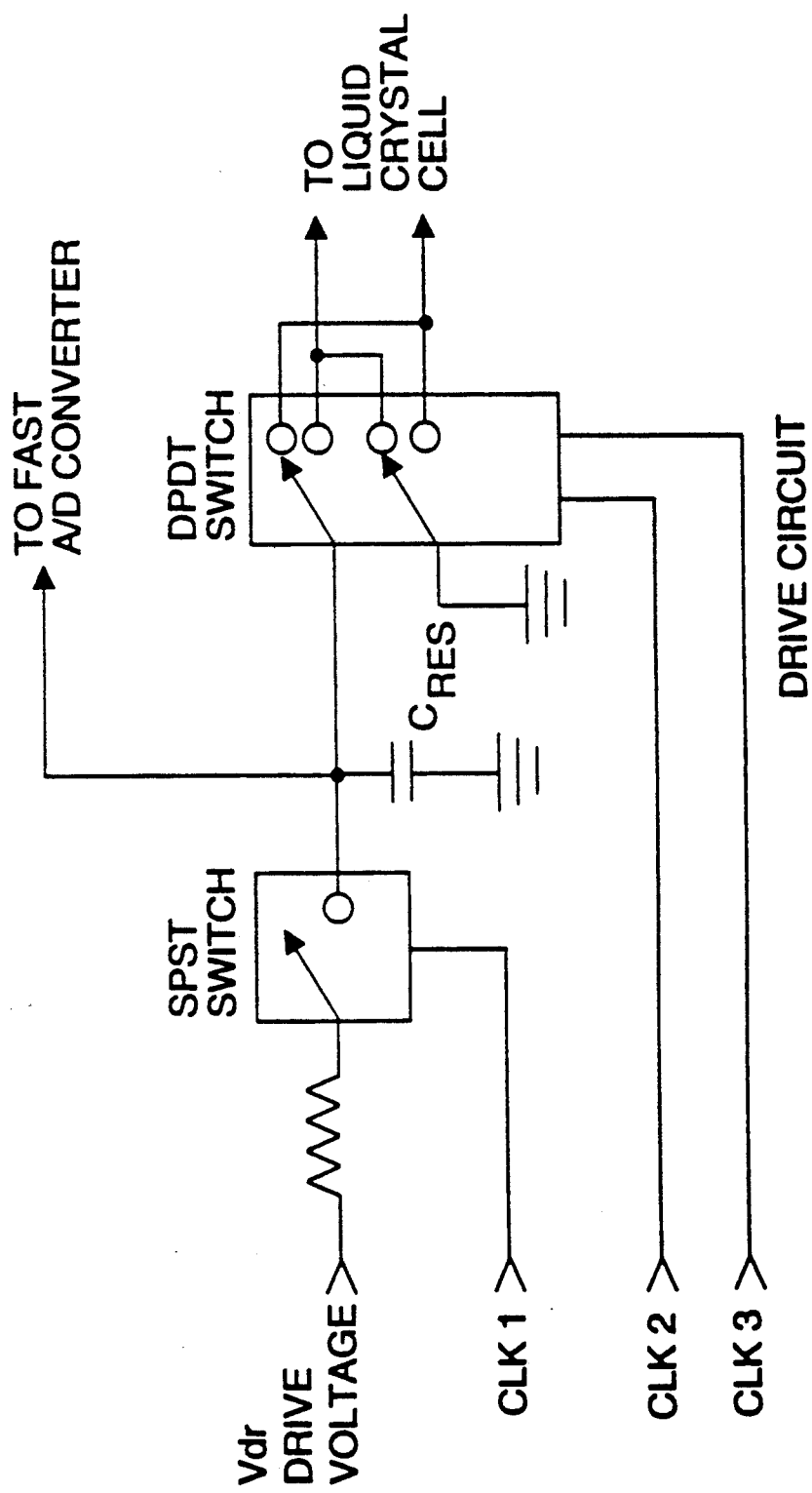
In FIGS. 4(A-B) the circuit for sensing the capacitance of a liquid crystal cell is shown.
Figure 5:
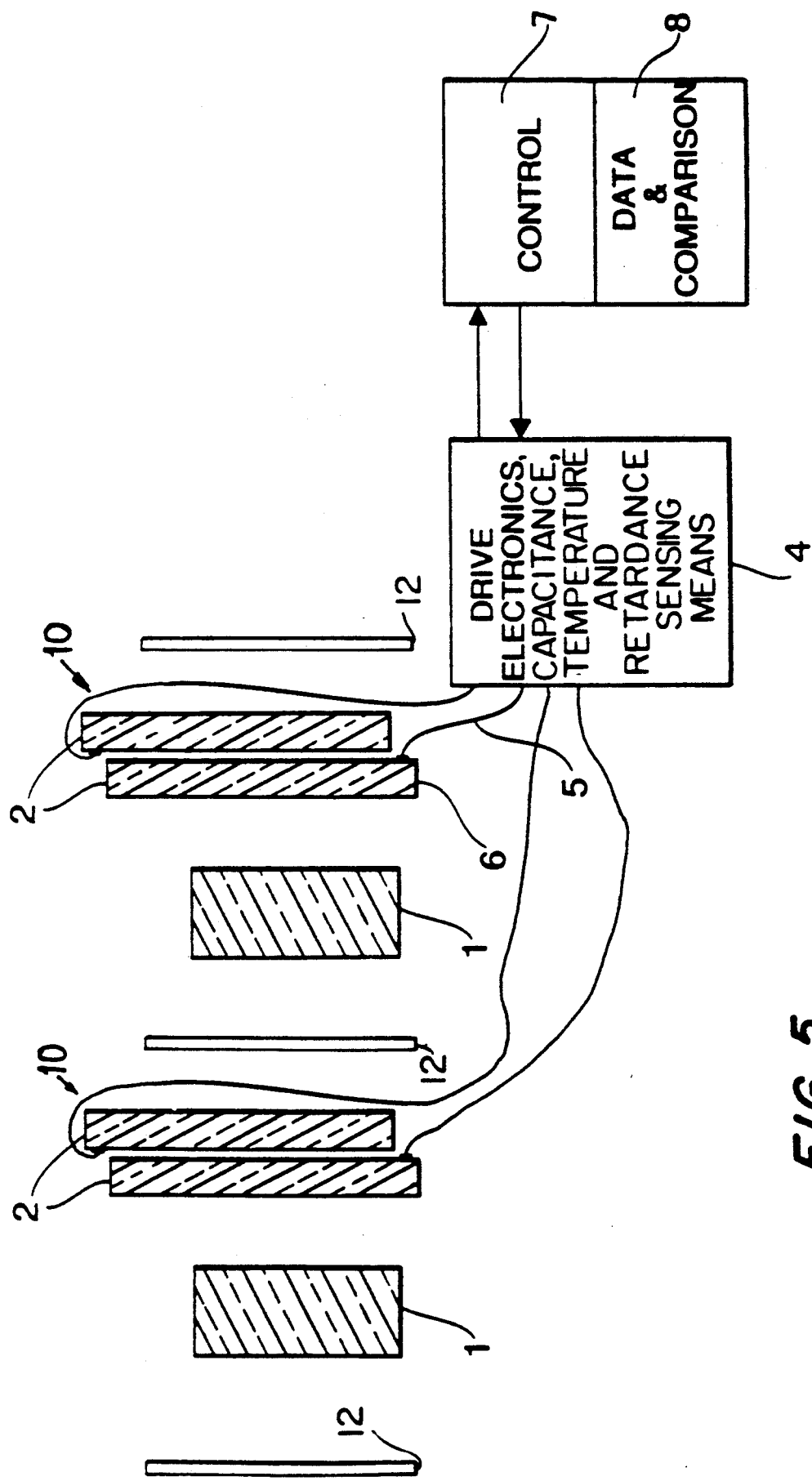

The preferred embodiment of the invention is a fixed retarder 1 used with a variable liquid crystal retarder 2. The fixed retarder is made of crystalline quartz that is an X-cut plate with a thickness of 1.0 millimeters. A range of between 0.3 and 10 millimeters of this type of quartz crystal are common in retarders and the precise thickness is dependent upon the total retardance desired. This fixed retarder 1 is placed in series with a variable retardance liquid crystal cell 2 that is filled with a nematic liquid crystal material 9 such as Merck ZLI.1132, available from E. M. Industries of Hawthorne, NY the agents for Merck of Darmstadt, West Germany. The liquid crystal thickness is typically in the 6 to 30 micron thickness range. The substrate material that confines the liquid crystal cell can be a standard display glass such as 7059 made by the Corning Glass Works, Corning, NY. A substrate of fused silica such as 7940 which is also made by Corning is also effective. The thickness of the substrate is chosen on the basis of fabrication requirements and the flexure expected under the hydrostatic forces involved. The optimum thickness thus depends on the aperture. In this cell with an aperture of 1 inch the thickness could be between 1 and 4 millimeters.

A transparent conductor layer 3 is needed on each of the inner faces of the cell. The conductive layer can be tin oxide, indium oxide or a combination of these materials. In fact other layers also are effective but in the most preferred embodiment we use a mixture of indium and tin oxides that are applied by vacuum deposition to the glass or quartz substrate. The electrical connection to the conductive layer is made by attaching an electrical mounting clip 6 to the conductive oxide layer with a conductive epoxy material.

An alignment layer is next deposited on the conductor coated substrate prior to assembly of the cell. This layer has as its goal the production of a so-called parallel alignment of the liquid crystal molecules as opposed to a homeotropic alignment. The techniques for making an alignment layer are well known and covered in depth in a monograph "Molecular crystals and liquid crystals" supplement 1 on "Alignment of nematic liquid crystals and their mixtures" authored by Jaques Cognard and published by Gordon and Breach (London, 1982). Deposition of SiO/SiO2 or other inorganic layers from controlled deposition angles can be used to make the alignment, or deposition of a soft polymer such as polyimide or polyvinyl alcohol followed by unidirectional rubbing with a cloth brush.

The cell may now be assembled. The preferred cell geometry requires that the two substrate layers have an exactly anti-parallel orientation of their alignment layers, which is termed the flat field geometry in the art. The fast axis of the cell is oriented parallel to the fast axis of the fixed quartz retarder. The cell is assembled using of Mylar polyester film or fiberoptic strands as a spacer between the substrates and is sealed with an epoxy glue. The cell, now with proper spacing of the substrates is sealed and then filled with the liquid crystal material and clamped into a cell holder. The cell sealant is arranged so as to leave a fill hole and is then vacuum filled. All the assembly steps are well-known in the art, and may be varied according to preference without compromising the functioning of the retarder.

A drive voltage is generated and applied to the cell to make it function. The drive voltage is generated by applying a selected voltage of one to 30 volts through a current-limiting resistor to a solid state SPST switch. This switch connects the voltage source to a reservoir capacitor C1 when enabled by clock signal CLK1. A second switch uses JFET or MOSFET elements configured in a DPDT wiring so that the two terminals of the liquid crystal cell are connected to ground and the reservoir capacitor, in alternate polarity. This switch must exhibit break-before-make timing, and there is a substantial time when the cell is disconnected completely from the capacitor and ground. The DPDT switch is driven by signals CLK2 and CLK3. When signal CLK2 is active, the cell is connected to ground and the reservoir capacitor in one polarity; when CLK3 is active, the cell is connected in the reverse polarity. Signals CLK1-CLK3 are generated by a clock circuit CGEN, which ensures that CLK2 and CLK3 are never active at the same time. The clock repetition rate is four kilohertz although the range of 500 Hz to ten kilohertz has been found to work very well.

The sequencing of clock signals CLK1-CLK3 produces the following results. The drive signal charges up the reservoir capacitor through the SPST switch, and it rapidly attains a voltage nearly equal to the drive signal voltage. During this time, the liquid crystal cell is not electrically connected to the rest of the circuit through the DPDT switch.

Then, the SPST switch is opened, leaving the reservoir capacitor with a known charge. The DPDT switch is engaged so that the liquid crystal cell is attached across the reservoir capacitor. Charge flows between the reservoir capacitor and the cell until an equilibrium is reached. Then the voltage sensor reads the voltage at the reservoir capacitor. This sensor is generally a fast analog-to-digital convertor, buffered by a high-impedence FET op amp After this reading is complete, the DPDT switch is made inactive (open-circuit), and the cycle repeats again with one difference: in the subsequent cycle, the liquid crystal cell will be connected with opposite polarity. Based on the known drive signal voltage $V_{dr}$ and the measured equilibrium voltage $V_{eq}$, the cell capacitance is calculated using the equation $$C_{lc\ cell} = C_{reservoir} \times \frac{V_{dr} - V_{eq}}{2V_{eq}} \qquad (35)$$

We pause to note that for these purposes only a relative determination of $C_{lc}$ is needed, and hence the value of $C_{res}$, need not be known in absolute terms This part must, however, be stable in time and temperature, and have a very low voltage coefficient of capacitance.

This electronic system provides a square wave differential output with a DC content of zero which is capable of driving the moderate capacitance of between 0.001 and 1 microfarad that these cells exhibit. Taken together, the quartz element, liquid crystal cell, and the electronics form a hybrid retarder with adjustment and sensing means.

A second embodiment is the modification of the preceding example with the liquid crystal cell constructed so that exactly parallel alignment of the opposite substrate surfaces is employed. Thin cells of this type are used in stereo-viewing apparatus where they are regularly cycled from driven state to relaxed state. However, parallel-aligned cells present special drive requirements when used as continuously variable retarders. One must ensure that such a cell is regularly presented with a substantial drive signal If the cell is undriven for more than a few milliseconds, the liquid crystal molecules take on a new orientation and the cell ceases to be a useful retarder for this purpose. A drive level of several volts is sufficient to prevent this occurrence.

In a third preferred embodiment also shown in FIG. 1, a system is constructed from a fixed crystal retarder, a calcite crystal in this case, a liquid crystal cell, and a pair of sheet polarizer 12. The fixed retarder is relatively thick, being between 10 and 15 millimeters thick. The liquid crystal cell is thin with a liquid crystal layer 15 micrometer thick. Thicknesses of 5 to 30 micrometers are common in these applications. The polarizers are located on either side of the hybrid retarder formed by the fixed retarder and liquid crystal element, and both polarizers are oriented with their transmission axes at 45 degrees to the fast axis of the hybrid cell.

The liquid crystal cell is supplied with a controllable AC voltage from a variable voltage power supply 4 which can sense load capacitance. The liquid crystal part of the system is calibrated by applying a series of voltages to the cell and measuring the retardance and the capacitance of the cell at each of these points. A table is made of the capacitance vs. the retardance values for reference purposes. The unexpected feature is that the capacitance is an excellent linear predictor of the actual retardance of the liquid crystal cell, much more linear than other indices used or than one would expect.

The retardance of the fixed retarder is determined by calculation or by measurement. The difference between the desired total retardance of the system and the retardance of the fixed retarder is determined and the remaining retardance can be selected from the graph that gives the retardance as a function of cell capacitance. The system consisting of a fixed retarder and a liquid crystal variable retarder can thus be adjusted by the liquid crystal element and the adjustment is a linear function of capacitance of the cell. This can be measured without optical means, unlike the retardance which requires bulky and expensive optical components.

In a fourth preferred embodiment, the data obtained in establishing the retardance vs. capacitance is used to make a voltage vs. retardance graph. It is useful, in a system having many retarders, to use only one capacitance measuring circuit. In this case, the retardance vs. capacitance table and capacitance vs. voltage table are generated at time of system power-up or at another calibration interval. When these tables are known, the liquid crystal cell can be driven with a simple AC voltage source circuit. Such a circuit is cheaper than a circuit with capacitive sensing capability. Typically, a single capacitive sensing circuit is switched through a multiplexer to each liquid crystal cell in turn and the required curves are obtained. Then cheaper, dedicated voltage drive circuits are used on each cell, using the tabular data to determine the required voltage for each cell.

In the last two examples, it is not necessary to measure a whole set of points to obtain the retardance vs. capacitance curve. The retardance, we have discovered, is a linear function of capacitance (or very nearly so). Armed with this knowledge, one can modify the previous two embodiments so that only two retardance and capacitance measurements are used: one at relatively high retardance and one at relatively low retardance. These form the endpoints of the line. From these points one knows the slope dR/dC, and by measurement of capacitance alone, one may reliably place the liquid crystal cell into a state of known retardance. Such a system constitutes a fifth preferred embodiment.

A sixth embodiment relies on the method expressed in the second embodiment and adds a correction for temperature. It is well known that a system will drift as temperature of the surroundings and of the retarder elements vary. These drifts may cause considerable difficulty when there is a need for high accuracy in the retardances involved. This invention utilizes well known or directly measured temperature vs. retardance relationships of system elements to add a second corrective measure to the retardance required to fine tune the hybrid retarder above. This additional change in drive level can be quantified as the change needed to vary the liquid crystal cell to compensate for changes in other system components. Since retardance is a linear function of capacitance, which is a function of the liquid crystal molecule orientation caused by the applied voltage, it is a simple matter to vary the cell drive voltage to compensate for temperature variations. There is instant feedback via capacitance measurement that the correction has been done and that the cell is at the desired retardance.

In a seventh embodiment the reference chart data used from graphs is burned into a memory chip or reduced to a data table that can input needed tuning of a retarder and compensations for temperature and any other measurable physical variations that can affect retardance and calculate a correction for these variations. The results can be manually or automatically applied to the liquid crystal cell drive voltage.

There are other methods to use this invention. One which allows improvement in the multi-wavelength scanning of objects uses a fixed retarder and one or more variable retarders. The variable retarders have a fast response time since they are relatively thin and the speed is a function of cell thickness The drive voltage of these units changes the retardance and the amount of change can be determined by measuring the cell capacitance. It is thus practical to blink between two or more retardance values by varying the drive voltage applied to the liquid crystal cells. While this blinking ability is of considerable benefit, it is further enhanced by use of a control loop that measures capacitance of the cells at each blink state and corrects for any drift in the retardance of the state by rapid variation in the drive voltage. This allows very accurate and stable determination of the wavelengths that are alternated. Such a system aids in removal of drift and temperature effects, and provides for improved ratiometric imaging.

Figure 6A:
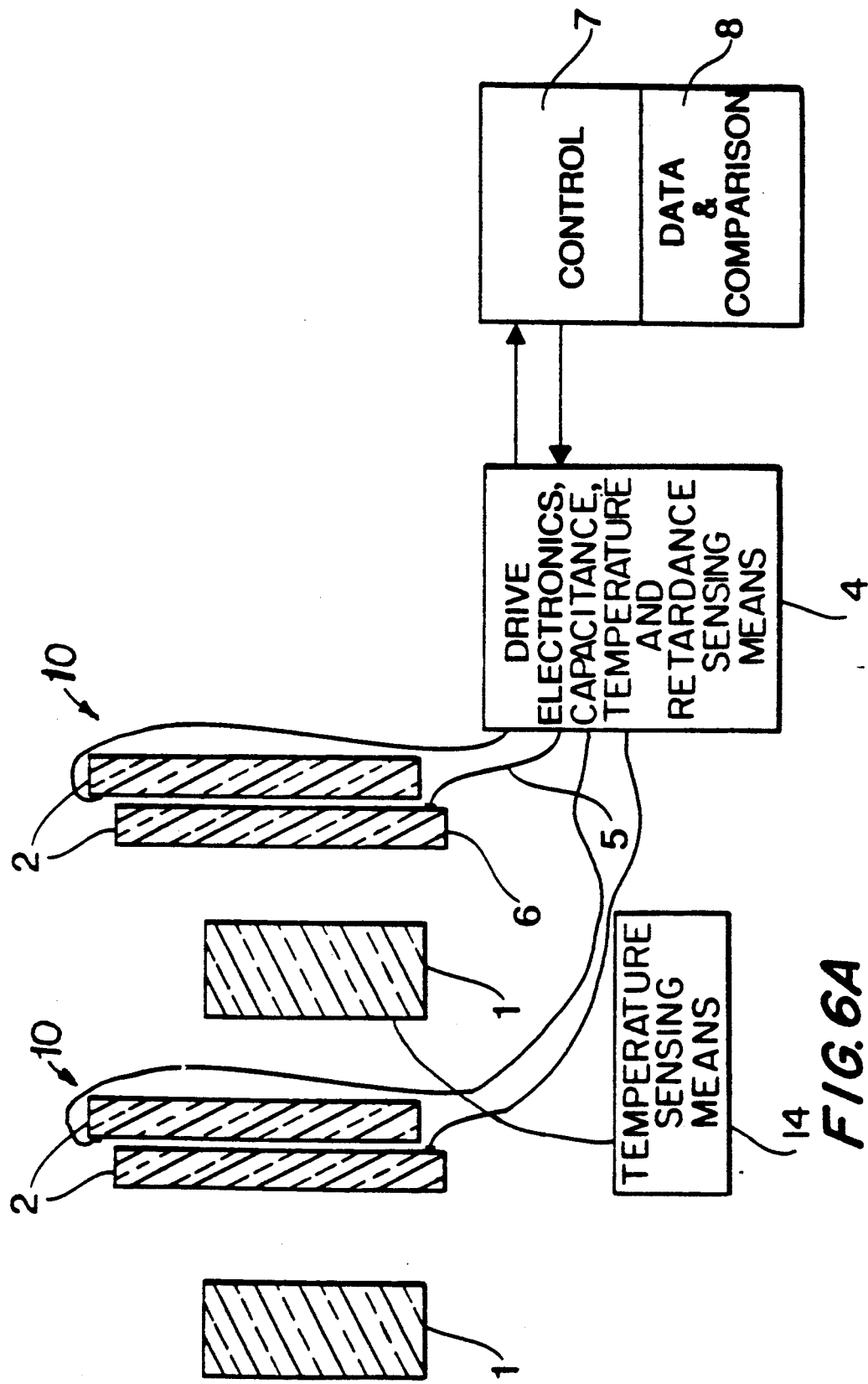

In another embodiment, as shown in FIG. 6A, a problem with thick liquid crystal cells is solved. Since the thickness greatly hinders rapid realignment of the bulk of material in the cell the response to changes and fine tuning of such a cell is slow. This invention uses a pair of liquid crystal cells: it provides approximately the desired retardance with a thick cell and then fine tunes the retardance with a very thin liquid crystal cell; since it is thin, it is very easily changed in retardance, even if the total retardance of the thin cell would be insufficient to meet the total retardance needs of the pair of cells. The thick cell is placed in a precisely known retardance state by means of capacitive sensing, which generates a precise predictor of its retardance.

In this invention it is evident that the methods and devices disclosed can be applied to many types of optical retardance systems. A Solc or Lyot filter configuration works well with the invention as one retarder in the filter. This is a precise way to allow rapid tunability of retardance of the filter. In fact there is considerable improvement in filter passband performance even when tuning is not required, since one can use the liquid crystal cell to make fine adjustments to the retardance of the fixed retarders for optimum performance, and can use the capacitance sensing to track the change of retardance made in the fine adjustment.

Referring now to FIG. 6B, a wide field tunable optical retarder is shown. As shown, this wide field tunable optical retarder comprises a half-wave late disposed optically in series between two fixed retarders and oriented with its fast axis at 45° to that of the first fixed retarder. A variable retardance liquid crystal cell is also placed optically in series with the fixed retarders whereby, when a drive voltage is applied to the transparent electrodes of the liquid crystal cell, a substantial and electrically variable retardance is produced which has improved performance for off-axis optical rays.

Figure 7:
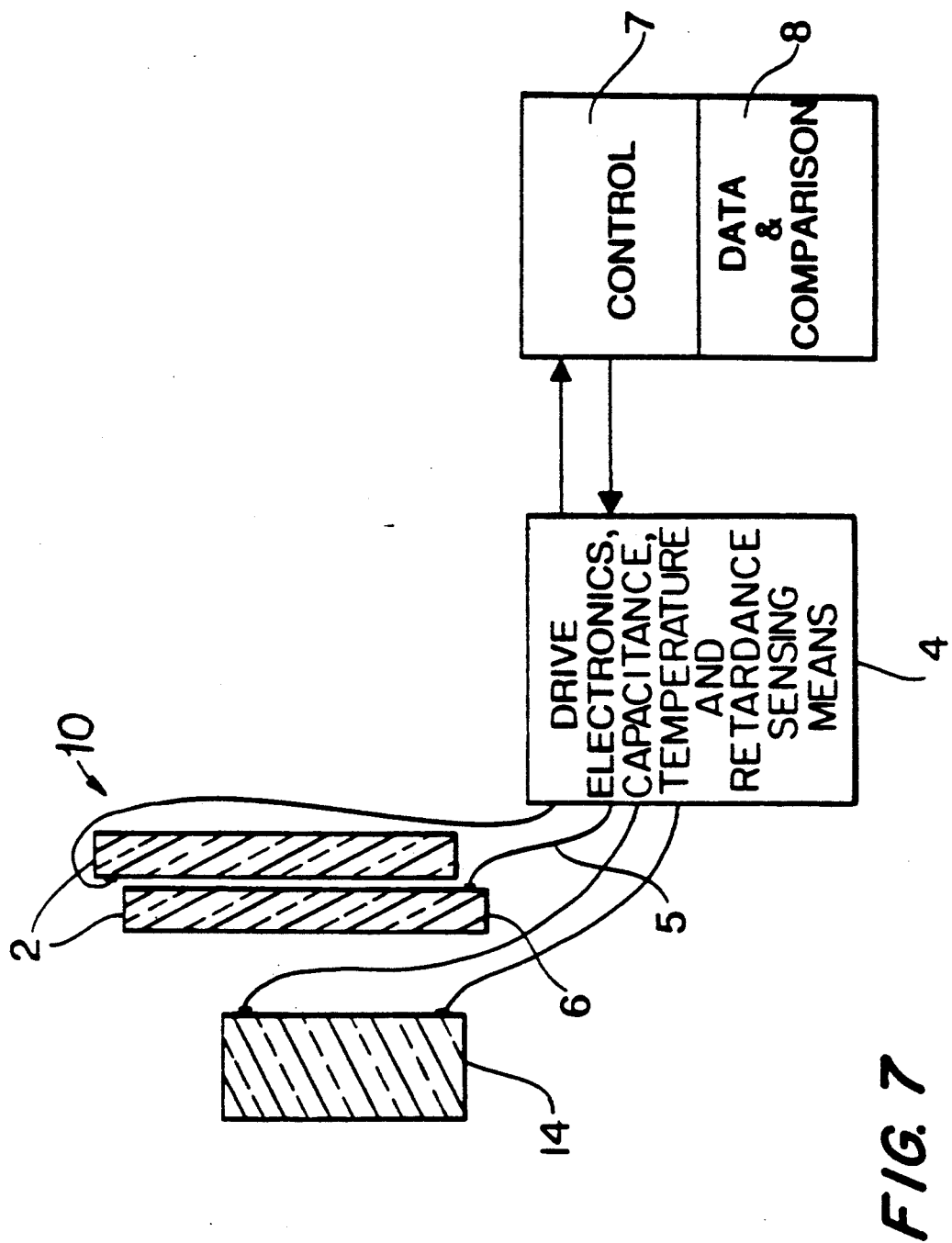

Another embodiment is shown in FIG. 7 wherein a different type of retarder, the Pockels cell, may also be used in a hybrid system with the liquid crystal cells. The Pockels cell is electro-optic and can provide a fast switching. However, these devices exhibit limited retardance adjustment range, and may possess a base level of retardance which is undesirable. By putting the Pockels cell in series with a liquid crystal cell, one obtains a system with fast switching and a wider control range than the Pockels cell alone can provide. Also, by providing the bulk of the retardance adjustment with the liquid crystal element, the adjustment range required of the Pockels cell may be greatly reduced. This reduces the drive voltage requirement of that device, simplifying its drive electronics.

In such a system, it is usually possible to produce a retardance in the liquid crystal cell such that the time-averaged electro-optic retardance required from the Pockels cell is zero. This, in turn, means that the DC applied voltage on that component is zero. Pockels cells operated in this way exhibit greatly improved lifetime and reliability, compared to Pockels cells with a DC time-averaged component. So, the present invention allows improved retardance control range, simplified drive electronics, and increases the lifetime of the expensive Pockels cell. These improvements are of advantage in many areas.

I claim as my invention;

1. An optical retarder comprising a liquid crystal variable retardance cell having substrate on either side thereof, each substrate having a transparent electrode on its inner face and a nematic phase liquid crystal material between said substrates;
   means for applying a drive voltage to said transparent electrodes;
   means for sensing the capacitance of said liquid crystal cell; and
   means for determining the retardance of the cell corresponding to the sensed capacitance thereof.

2. The optical retarder of claim 1, wherein the inner faces of said cell have a substantially antiparallel alignment of the liquid crystal directors at the opposite faces.

3. The optical retarder of claim 1, wherein said determining means further comprises means for computing retardance for said sensed capacitance pursuant to a predetermined mathematical algorithm.

4. The optical retarder of claim 1, further comprising means for varying said drive voltage and means for recording a plurality of sensed capacitance values and their corresponding drive voltages whereby a relationship is established between drive voltage and retardance.

5. The optical retarder of claim 1, wherein said determining means comprises a predetermined relation between the capacitance and the retardance defined by a plurality of capacitance values and their corresponding retardance values.

6. The optical retarder of claim 1, wherein the inner faces of said cell have a substantially parallel alignment of the liquid crystal directors at the opposite faces.

7. The optical retarder of claim 1, further comprising means for varying said drive voltage for adjusting said capacitance to a value corresponding to a desired retardance.

8. A tunable optical retardance system comprising:
   a first hybrid retardance element including;
   a fixed retardance element;
   a variable retardance cell fixed optically in series with said fixed retardance element, the fixed retardance element having a slow axis oriented parallel to either the fast or slow axis of the variable retardance cell, said variable retardance cell comprising a liquid crystal cell having substrates on either side thereof, each substrate having a transparent electrode on its inner face, and a nematic phase liquid crystal material therebetween;
   means for sensing the retardance of said variable retardance cell; and
   first means for applying a variable drive voltage to said electrodes of said first hybrid element for tuning the retardance of the optical retardance system.

9. The system of claim 8, wherein said sensing means comprises means for sensing the capacitance of the liquid crystal cell.

10. The system of claim 9, wherein said sensing means further comprises means for computing retardance from the sensed capacitance pursuant to a predetermined mathematical algorithm.

11. The system of claim 9, further comprising means for varying said drive voltage and means for recording a plurality of sensed capacitance values and their corresponding drive voltages whereby a relationship is established between drive voltage and retardance.

12. The system of claim 9, further comprising control means for varying the drive voltage for obtaining a preselected retardance.

13. The system of claim 9, wherein said sensing means further comprises a look-up table having a predetermined plurality of capacitance values and their corresponding retardance values.

14. The system of claim 8, further comprising at least a second hybrid retardance element optically in series with said first hybrid retardance element, said second hybrid element comprising:
   a second fixed retardance element;
   a second variable retardance cell fixed optically in series with said second fixed retardance element, the second fixed retardance element having a slow axis oriented parallel to either the fast or slow axis of the second variable retardance cell, said second variable retardance cell comprising a liquid crystal cell having substrates on either side thereof, each substrate having a second transparent electrode on its inner face, and a nematic phase liquid crystal material therebetween; and
   at least a second means for applying a variable drive voltage to said corresponding second electrodes of said second hybrid element for tuning the retardance of the optical retardance system.

15. The system of claim 14, further comprising a first linear polarizer positioned at one end of said plurality of said hybrid retardance elements and a second linear polarizer positioned at the other end of said plurality of said retardance elements for defining a single filter stage in a Sole configuration.

16. The system of claim 15 wherein said first and second means for applying a drive voltage comprise means for stepping said first and second drive voltages, respectively, for serially transmitting multiple preselected wavelengths.

17. The system of claim 14, further comprising a first linear polarizer positioned at one end of said plurality of said hybrid retardance elements, a second linear polarizer positioned at the other end of said plurality of said hybrid retardance elements and a polarizer disposed between adjacent hybrid elements for defining a multiple stage Lyot configuration.

18. The system of claim 8, further comprising a linear polarizer on either side of said hybrid retardance element for defining a single filter stage in a Lyot configuration.

19. The system of claim 18, wherein said first means for applying a drive voltage comprises means for stepping said drive voltage for serially transmitting multiple preselected wavelengths.

20. A temperature-compensated optical retarder system comprising:
a liquid crystal cell having substrates on either side thereof, each substrate having a transparent electrode on its inner face and a nematic phase liquid crystal material between said substrates;
means for applying a drive voltage to said transparent electrodes;
means for sensing the capacitance of said liquid crystal cell;
means for storing a plurality of predetermined capacitance values and their corresponding retardance values for a plurality of temperatures;
a temperature sensor for sensing the temperature of said liquid crystal cell; and
control means connected to said temperature sensor and said storing means for determining a capacitance for the desired retardance at the sensed temperature.

21. The system of claim 20 wherein said storing means further comprises means for storing a plurality of predetermined capacitance values and their corresponding retardance values for at least one temperature and multiplying said stored values by a predetermined coefficient to obtain capacitance values and their corresponding retardance values for temperatures different than said at least one temperature.

22. The system of claim 20, wherein said control means further comprises means for selecting a drive voltage corresponding to said determined capacitance for maintaining said desired retardance despite variation in ambient temperatures.

23. A temperature-compensated optical retarder system comprising:
at least one fixed retarder;
a liquid crystal variable retardance cell in series with said at least one fixed retarder, said liquid crystal cell having a substrate on either side thereof, each substrate having a transparent electrode on its inner face and a nematic phase liquid crystal material therebetween;
means for applying a drive voltage to said transparent electrodes;
a temperature sensor for determining a temperature indicative of the temperature of the fixed retarder;
control means for determining the variation in retardance of said at least one fixed retarder corresponding to measured temperature changes and for adjusting said drive voltage for producing in said liquid crystal cell an opposing retardance shift for maintaining a constant system retardance.

24. The system of claim 23, further comprising means for sensing the capacitance of said liquid crystal cell;
means for storing a plurality of predetermined capacitance values and their corresponding retardance values for a plurality of temperatures; and
wherein said control means varies said drive voltage for producing the desired opposing retardance shift in said liquid crystal cell based on information from said storing means and said temperature sensor.

25. A wide field tunable optical retarder comprising:
first and second fixed retarders of similar retardance arranged optically in series, the fast axis of one retarder being parallel to the slow axis of the other such that their fast axes are orthognol for normally incident rays;
a half-wave plate disposed optically in series between said first and second fixed retarders and oriented with its fast axis at 45° to that of the first fixed retarder;
a first variable retardance liquid crystal cell optically in series with said first and second fixed retarders, said liquid crystal cell having a substrate on either side thereof, each substrate having a transparent electrode on its inner face and a nematic phase liquid crystal material therebetween; and
means for applying a first drive voltage to said transparent electrodes of said first liquid crystal cell whereby a substantial and electrically variable retardance is produced which has improved performance for off-axis optical rays.

26. The retarder of claim 25, wherein said half-wave plate comprises a second variable retardance liquid crystal cell having a substrate on either side thereof, each substrate having a transparent electrode on its inner face, and a nematic phase liquid crystal material therebetween; and
further comprising means for applying a second drive voltage to said transparent electrodes of said second liquid crystal cell for achieving a substantial and electrically variable retardance useable over a wide range of wavelengths.

27. A variable retarder permitting rapid modulation of retardance over a moderate range of retardances, comprising:
a variable retardance liquid crystal cell having a substrate on either side thereof, each substrate having a transparent electrode on its inner face and a nematic phase liquid crystal material therebetween;
means for applying a drive voltage to said electrodes for varying the retardance of said liquid crystal cell;
a Pockels cell optically in series with said liquid crystal cell; and
means for applying a drive voltage to said Pockels cell for providing rapid modulation of the retardance of said variable retarder.

28. The retarder of claim 27, further comprising means for measuring the capacitance of said liquid cell and for providing a capacitance signal indicative of the retardance of the liquid crystal cell as the drive voltage applied to said liquid crystal cell is varied; and
control means for adjusting the drive voltage applied to said liquid crystal cell based on said capacitance signal for selecting a predetermined retardance for the liquid crystal cell.

29. A controlled retardance system for providing rapid modulation of retardance over a moderate range of retardances, comprising:

a variable retardance liquid crystal cell having a substrate on either side thereof, each substrate having a transparent electrode on its inner face, and a nematic phase liquid crystal material therebetween;

means for applying a first drive voltage to said electrodes for varying the retardance of said cell;

a Pockels cell optically in series with said liquid crystal cell, said Pockels cell having a pair of control electrodes;

means for applying a second drive voltage to said control electrodes;

means for sensing the overall retardance of said liquid crystal cell and said Pockels cell; and control means responsive to said sensing means for varying said first drive voltage for producing a desired average level of system retardance.

* * * * *